United States Patent [19]

Eilerman

[11] 3,876,405

[45] Apr. 8, 1975

[54] GLASS FIBER COATING PROCESS

[75] Inventor: George E. Eilerman, Pittsburgh, Pa.

[73] Assignee: PPG Industries, Inc., Pittsburgh, Pa.

[22] Filed: Aug. 2, 1973

[21] Appl. No.: 384,875

[52] U.S. Cl. ............................. 65/3; 65/24; 65/60; 260/29.3
[51] Int. Cl. ............................................ C03c 25/02
[58] Field of Search ............. 65/3, 24, 60; 260/29.3, 260/3

[56] References Cited
UNITED STATES PATENTS

| | | | |
|---|---|---|---|
| 2,937,159 | 5/1960 | McKay et al. | 260/29.3 |
| 3,133,034 | 5/1964 | Clair et al. | 260/29.3 |
| 3,437,122 | 4/1969 | Gils | 260/29.3 X |
| 3,591,357 | 7/1971 | Janetos et al. | 65/3 |
| 3,684,467 | 8/1972 | Smucker et al. | 65/3 |
| 3,718,448 | 2/1973 | Drummond et al. | 65/3 |
| 3,718,449 | 2/1973 | Fahay | 65/3 |

*Primary Examiner*—S. Leon Bashore
*Assistant Examiner*—Kenneth M. Schor
*Attorney, Agent, or Firm*—Robert DeMajistre

[57] ABSTRACT

Individual glass fibers are coated with a composition which includes the Mannich reaction product of substitutable dihydric or trihydric phenol, formaldehyde and a primary or secondary amine. The preferred coating composition comprises an aqueous mixture including the aforementioned Mannich reaction product or an acid adduct thereof and an elastomeric latex selected from the natural and synthetic rubber latices such as neoprene rubber, isoprene rubber, butyl rubber, butadiene-styrene copolymer rubber, acrylonitrile-butadiene-styrene terpolymer rubber, styrene-butadiene-vinylpyridine terpolymer rubbers and the like. An aqueous solution of the coating composition is prepared and applied to glass fibers as a sizing composition and/or as a coating composition after the glass fibers are sized. Subsequent to coating of the glass fiber strands with the aforementioned coating composition, the strands are dried by heating in a microwave oven, a forced air oven or the like.

3 Claims, No Drawings

GLASS FIBER COATING PROCESS

BACKGROUND OF THE INVENTION

This invention relates to a coating composition for glass fibers and more particularly to an aqueous coating composition that includes the Mannich reaction product of a dihydric or trihydric phenol having substitutable positions, formaldehyde and a primary or secondary amine for coating glass fibers for use in reinforcing elastomeric products.

It has long been recognized that glass fibers should make an ideal reinforcement for automobile tires (U.S. Pat. No. 2,184,326), rubber timing belts (U.S. Pat. No. 2,135,057) and other rubber or rubberlike materials. In preparing glass fibers for such applications, glass fibers in the form of strands, yarn, roving or fabric are coated with an adhesive to aid in bonding of the glass to elastomeric material. By far the most widely used adhesive for preparing glass fibers for reinforcing rubber or rubberlike materials is a resorcinol-formaldehyde resin with an elastomeric latex. The resorcinol-formaldehyde resin is generally applied to glass fiber material prior to molding of the reinforced article by contacting a glass fabric, strand, yarn or the like with an aqueous latex mixture having the resorcinol-formaldehyde resin dispersed therein. Largely because of its high cost a satisfactory substitute for all or part of the resorcinol-formaldehyde resin has long been sought. Additionally the resorcinol-formaldehyde resin latex mixture is difficult to apply to glass fabric in a manner whereby the resin may thoroughly impregnate and coat the glass fibers which form the fabric. Therefore uncoated glass fiber strands often times remain in the fabric after being contacted with the resinous mixture. These strands are subject to glass on glass abrasion which soon destroys the long strands of glass and renders its reinforcing properties unsatisfactory. Further, resorcinol-formaldehyde resins in aqueous solution, over a long period of time, and when subjected to both ambient and superambient temperatures, have a tendency to further polymerize thereby changing the chemical and physical properties of the coatings formed therefrom.

It has been proposed that glass fiber materials be coated while being formed with a rubber adhesive in order to insure complete coating of a glass fiber with coating materials. For example, a glass fiber strand composed of a multitude of individual fine glass fibers or filaments formed by being drawn from a molten cone of glass located at the tips of small orifices in a bushing such as shown in U.S. Pat. No. 2,133,238 are contacted with a bath containing the adhesive material. However, difficulty has been encountered in coating glass fibers in this manner because the adhesive resorcinol-formaldehyde latex mixture remains tacky after application and drying and interferes with subsequent twisting, winding and spinning operations performed on the glass fibers to form roving, yarn, fabric and the like.

In a typical two-step operation glass fibers formed as described above are coated while moving at a high speed with the sizing composition containing a glass binder and lubricant to yield a strand comprising a multitude of individual glass filaments having sufficient integrity for workability in formation into yarn or the like. After the size has been applied to the glass, a number of strands in parallel form are coated with the coating composition, dried and then wound on a tubular support to form glass fiber roving which may then be formed by twisting, spinning or weaving into yarn fabric or other forms suitable for use as reinforcement for elastomeric products.

By sizing composition as, opposed to a coating composition, is meant a composition for coating glass fibers useful for reinforcing rubber and rubberlike materials characterized by a weight gain of glass fiber material when subject to a sizing treatment of about 0.5 to 2 percent based upon dry glass as opposed to a weight gain of about 15 to 30 percent based upon dry glass in a coating application wherein a rubber adhesive is applied to the glass fiber material.

A sizing composition or size is usually an aqueous dispersion including the addition of a lubricant, a coupling agent or finished material. The coupling agent or finished material renders the surface of the glass fibers compatible with the resin with which they are to be employed in preparing a glass fiber reinforced elastomeric product and aids in bonding the fibers thereto.

U.S. Pat. No. 3,718,448 entitled "Fiber Forming and Coating Process" by Warren W. Drummond and Donald W. Denniston assigned to the assignee of this invention discloses apparatus for applying a combined sizing and coating composition to individual glass fibers and then drying the fibers in strands and collecting the dried strands on a forming tube. By this process the glass fibers are simultaneously coated with both the sizing and coating in a single coating step that reduces substantially the time and equipment required to process the glass fibers for use as a reinforcement in elastomeric products. The combined sizing and coating composition previously employed with this process included only resorcinol-formaldehyde as the resin constituent. There is a need therefore for a coating composition and/or a combined sizing and coating composition that may be more economically prepared and applied to the glass fibers and has increased stability over the conventional resorcinol-formaldehyde based adhesive compositions.

SUMMARY OF THE INVENTION

This invention provides novel coating compositions for preparing glass fibers for use in reinforcing elastomeric products. The invention provides novel coating compositions for glass fibers permitting improved impregnation of a glass fiber strand composed of a multiplicity of individual glass filaments with rubber adhesive. Additionally there are provided combined sizing and coating compositions for glass fibers enabling the application of sizing and adhesive chemicals to a glass fiber strand in a single-step application.

The invention provides a coating composition for glass fibers for use in reinforcing elastomeric products wherein the Mannich reaction product of a dihydric or trihydric phenol having at least two substitutable positions, formaldehyde and a primary or secondary amine is a major constituent. A typical combined sizing and coating composition comprises an aqueous mixture of the above-mentioned Mannich reaction product, a synthetic rubber latex such as polyneoprene, polyisoprene, butyl rubber, butadiene-styrene rubber, acrylonitrile-butadiene-styrene terpolymer rubber, styrene-butadiene-vinylpyridine terpolymer rubber, natural rubber and the like. The rubber adhesive portion of the coating composition comprises generally the Mannich reaction product which may be employed in admixture with the remaining ingredients to form a material useful for both sizing and coating glass fibers in a single application as the glass fibers are formed and drawn. The procedure involving both the sizing and coating procedures in a single step is more fully disclosed in U.S. Pat. No. 3,718,449. Alternatively the rubber adhesive portion together with latex portion may be applied to a previously sized glass fiber in the form of strands and yarns in a subsequent application step.

In addition to the rubber adhesive described above, a silicone coupling agent may be employed to aid in the bonding of the adhesive composition to the glass fibers. Preferably the coupling agent is an amino silane type coupling agent having the general formula:

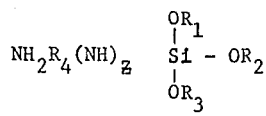

or a uredo silane coupling agent having the general formula:

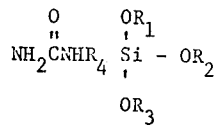

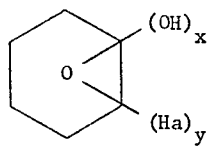

wherein $R_1$, $R_2$ and $R_3$ are the same or different and are selected from the lower alkyl or aliphatic hydrocarbon radicals having less than 8 and more preferably less than 5 carbon atoms. $R_4$ is a divalent alkylene radical having less than 8 carbon atoms, and Z is either 1 or 0. The coating composition and/or the combined sizing and coating composition is employed at a level of about 15 to 40 percent by weight of the dried residue of the coating composition as a weight gain on the initial glass fibers.

The following example is illustrative of a coating composition and/or combined sizing and coating composition according to the invention which may be used in the coating procedure more fully described in U.S. Pat. No. 3,718,449 (the single-step process) for applying the coating and sizing ingredients to glass fiber materials for preparing glass fibers for reinforcing elastomeric products. Glass fibers may be contacted with the coating composition as a combined sizing and coating composition as they are formed. Preferably the glass fibers are contacted with a composition within a few feet of the bushing and cone from which they are being drawn as previously referred to in U.S. Pat. No. 3,718,449. The combined sizing and coating composition described hereinafter and other compositions of the invention may also be applied by conventional roller applicators such as described in U.S. Pat. No. 2,873,718 or in the case of previously sized glass fibers may be coated by applying the rubber adhesive composition by means of passing the sized glass fiber strands over a plurality of roller applicators placed in a bath of the aqueous coating composition. Drying of the coated glass fibers may be accomplished by passing the coated strands through a microwave oven, a forced hot air oven or through other means which imparts sufficient heat to remove the water contained in the coating composition and promotes the reaction of the constituents therein to effect a partial or complete cure.

A suitable formulation for the coating composition may be prepared containing the following ranges of constituents:

| Constituents | Percent By Weight |
|---|---|
| Mannich reaction product (40 – 50% solids) | 25 to 75 |
| Natural or synthetic rubber latex (40 – 60% solids) | 25 to 75 |
| Coupling agent | 0 to 5 |
| Water | 0 to 75 |

The Mannich reaction generally is a reaction of a compound having a reactive C— H bond. In the case of the instant invention, the reactants are a dihydric or trihydric phenolic compound, formaldehyde and a primary or secondary amine. The reaction can be characterized as follows:

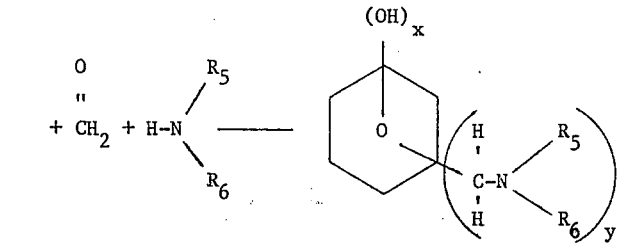

wherein $x$ is an integer denoting the number of phenolic hydroxyls on the aromatic compound being at least 2; for example, in the case of resorcinol, $x$ would equal 2, in the case of pyrogallol, $x$ would equal 3. Ha is a reactive hydrogen atom capable of undergoing electrophilic aromatic substitution in the context of the Mannich reaction. $y$ is the number of said hydrogens and $y$ is at least 2. $R_5$ and $R_6$ are alkyl or aryl radicals having 2 to 10 carbon atoms or hydrogen and may be the same or different. However, in any case when $R_6$ is hydrogen, $R_7$ is alkyl or aryl and when $R_7$ is hydrogen, $R_6$ is alkyl or aryl. In addition, $R_6$ and $R_7$ may be covalently bonded to each other in the case when a cyclic or heterocyclic amine is used in the reaction. In such case $R_6$ and $R_7$ will be divalent, aromatic or aliphatic or heterocyclic radicals.

The procedure for synthesizing the Mannich reaction product is as follows. The desired phenol and amine are dissolved in water at room temperature. The aldehyde is then added while maintaining the temperature of the mixture below 20°C. After addition of the aldehyde is complete, the mixture is stirred for about 15 minutes to about 2 hours to assure completion of the reaction. After the mixture is stirred for the desired period of time, it may be incorporated into an adhesive composition; or a carboxylic acid or anhydride may be added in order to form an adduct of the Mannich reaction product so that it may be more soluble in an aqueous solution, this adduct may be incorporated into an adhesive composition.

Typical phenols useful in producing the Mannich reaction product are resorcinol, pyrogallol and the like. Typical amines useful in producing the Mannich reaction product are the primary amines such as ethyl amine, propyl amine, ethanol amine, isopropyl amine, aniline and the like. Aliphatic secondary amines may also be used and are typified by amines such as diisopropyl amine, diisopropanol amine, diethanol amine, dibutyl amine and the like and the heterocyclic secondary amines such as morpholine, 1,2-diazol, paraisoxazine, 1,2,3-dioxazole, azepine, indole, 1,4-benzisoxazine and the like. The acids that may be used to form adducts with the Mannich reaction product to make them more soluble in the aqueous solution are typically the dicarboxylic acids such as phthalic acid, isophthalic acid, terephthalic acid and the like; aliphatic acids such as succinic acid, maleic acid, adipic acid, sebacic acid, azaleic acid and the like; monocarboxylic aliphatic acids such as formic acid, acetic acid, propionic acid, acrylic acid, alpha-chloropropionic acid and the like, and aromatic carboxylic acids such as benzoic acid, chlorobenzoic acid, naphthalene monocarboxylic acid and the like.

The latices useful in formulating the coating composition are typically styrene-butadiene-vinylpyridine latex, natural rubber latex, polyisoprene latex, butyl rubber latex, butadiene-styrene latex, acrylonitrile-butadiene-styrene terpolymer latex and the like. These latices are typically supplied at 40 to 60 percent solids by weight.

EXAMPLE I

Mannich Reaction Products

To a 1 liter flask equipped with a mechanical stirrer, a thermometer, an addition funnel and reflux condenser was charged 88 grams of resorcinol, 146.4 grams of ethanol amine and 184 grams of water. This mixture was agitated at ambient temperature until homogeneous. Two hundred twenty-six and four-tenths grams of 37 percent formaldehyde was added to the above solution while maintaining the temperature, by means of a cooling bath, below 20°C. After the addition of formaldehyde was complete, the mixture was stirred for 15 minutes, thus producing a compound of the structural formula.

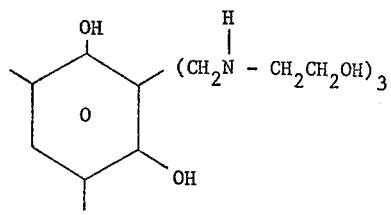

Adduct Formation

To the above mixture at ambient temperature was added by means of a powder funnel 100 grams of phthalic anhydride. The mixture is then stirred until homogeneous, after which 100 grams of water is added. The total percent solids of the solution is 44 percent.

Preparation of Coating Composition

Three hundred and fifty-six grams of the above adduct of the Mannich condensation product, 312 grams of water, and 4 grams of sodium perborate were charged to a 1,500 milliliter beaker and agitated for 30 minutes, after which, 400 grams of butadiene-styrene latex (40 percent solids) was added with manual agitation. After this mixture became homogeneous, a sample of sized glass fiber yarn having 5 strands with a filament count of 75 was dipped in the above composition. The coated glass fiber yarn was cured in a 5 foot long muffle furnace at 440°F. at 5 feet per minute and impregnated with standard rubber stock used for producing tires. Typical commercial rubber compounds containing principally styrene-butadiene rubber and selected to have the following properties are used to test glass fiber properties: optimum cure at 300°F. about 30 minutes, 300 percent modulus at about 1,900 pounds per square inch, tensile strength about 2,900 pounds per square inch, and elongation at failure about 1.13.

Strip adhesion for rubber coated glass fiber cord is determined by the following method. A cylindrical drum was wrapped with a 4 by 10 ½ inch, 40 mil thick strip of rubber stock; the rubber stock occupied substantially all the surface area of the cylindrical drum. The coated glass fiber yarn is wrapped about the rubber stock on the drum in a cylindrical fashion providing a continuous layer of yarn over the rubber stock. The wound rubber stock is removed from the cylinder and cut into a 3 by 10 inch sample.

A strip of 3 by 10 inch rubber is placed in a 3 by 10 inch mold and the above rubber strip with the coated strand thereon is placed in the mold with the strand side away from the first rubber strip. Two 3 by 1 inch strips of Holland cloth are placed at opposite ends of the strand side of the rubber strip. Another 3 by 10 inch rubber strip is placed over the Holland cloth and lastly a 3 by 10 inch rubber strip with coated strand thereon is placed on the last mentioned rubber strip with the strand side in contact with the said last mentioned rubber strip. The mold is closed and the rubber cord laminate is cured at 100 psi for 30 minutes at 300°F. The rubber cord laminate is removed from the mold and allowed to slowly cool overnight.

The laminate is cut into 5 ½ by 1 inch strips and heated for 30 minutes at 230°F. after which the Holland cloth is removed from the laminate. After setting an Instron test device for a gauge length of ½ to ¾ inch and callibrating the unit for a crosshead speed of 2 inches per minute, the bottom layer of the heated rubber and exposed cord are placed in the top jaw, and the top layer of the heated rubber in the bottom jaw of the test device. The Instron test device is operated until a separation of 2 inches is obtained and the loading is noted. The top layer of rubber is then inserted in the top jaw and the cord in the bottom jaw with a gauge length of ½ to ¾ inch. The Instron device is again operated until a separation of 2 inches is obtained and the loading is noted. The test is repeated for the opposite end of the spectrum and for additional specimens included in the sample. The results of the test are averaged for the adhesion of the cord to rubber. Adhesion tested in this manner on several samples ranged from 36 to 50 pounds.

EXAMPLE II

E-glass composed of 54.4 percent by weight of $SiO_2$, 13.4 percent by weight of $Al_2O_3$, 21.7 percent by weight of CaO, 0.4 percent by weight of MgO, 8.5 percent by weight of $B_2O_3$, 0.5 percent by weight of $F_2$, 0.7 percent by weight of $Na_2O$, 0.5 percent by weight of $TiO_2$, and 0.2 percent by weight of $Fe_2O_3$ is melted at 2,400°F. in an 80 percent platinum, 20 percent rhodium bushing containing orifices of 80 one-thousandths of 1 inch in diameter. Glass fibers are then drawn by attenuating the molten glass from cones of glass at the bushing orifice to form glass fiber filaments. After the filaments are formed, they are passed over a roller applicator having on the surface thereof the coating composition (now a sizing composition) of Example I. After the sizing composition is applied, the sized filaments are gathered by means of a gathering shoe, into a strand. The strand is then passed over several roller applicators in a reservoir containing the coating composition of Example I. After the coating composition is applied, the strands are then passed through a forced air oven to cure the coated glass fiber strand. The cured coated glass fiber strand having a 30 percent weight gain based upon the weight of the dry glass of the sizing and coating composition is impregnated with standard rubber stock and tested for adhesion in accordance with the methods employed in Example I. The rubber articles tested in this manner have adhesions ranging between 36 and 50 pounds.

Similar results may be obtained when other synthetic latices as hereinbefore mentioned are useful in lieu of the styrene butadiene latex of Examples I and II. Additionally, similar Mannich condensation reaction products such as those derived from morpholine may be used as a substitute for the ethanol amine reaction product, along with other compositions as hereinbefore discussed. Also these compositions may be used as a combined sizing and coating composition in accordance with the procedures described in U.S. Pat. No. 3,718,449.

While the invention has been described with respect to details of a preferred coating composition, other formulations of the coating composition and the combined coating and sizing composition are contemplated and should be obvious in light of the specification. It is thus to be understood that the invention is not necessarily limited to the precise formulations and methods described herein except insofar as is set forth in the accompanying claims.

I claim:

1. A method of preparing glass fiber strands for reinforcing elastomeric compositions comprising drawing glass fibers from molten cones of glass, applying to the fibers as they are being withdrawn an aqueous coating and sizing composition comprising a substantial quantity of water, an elastomeric latex selected from the group consisting of natural and synthetic rubber latices and a rubber adhesive selected from the group consisting of the Mannich reaction condensation product of a dihydric or trihydric phenol having at least two substitutable positions, formaldehyde and a primary or secondary monoamine, gathering the fibers together into strands and drying the strands to thereby provide glass fiber strands having a weight gain of between 15 and 40 percent by weight based upon the weight of the dry glass of said sizing and coating composition.

2. The method of claim 1 wherein there if a silane coupling agent employed in the coating composition.

3. The method of claim 2 wherein said coupling agent is gamma amino propyltriethoxysilane.

* * * * *